Patented Jan. 1, 1935

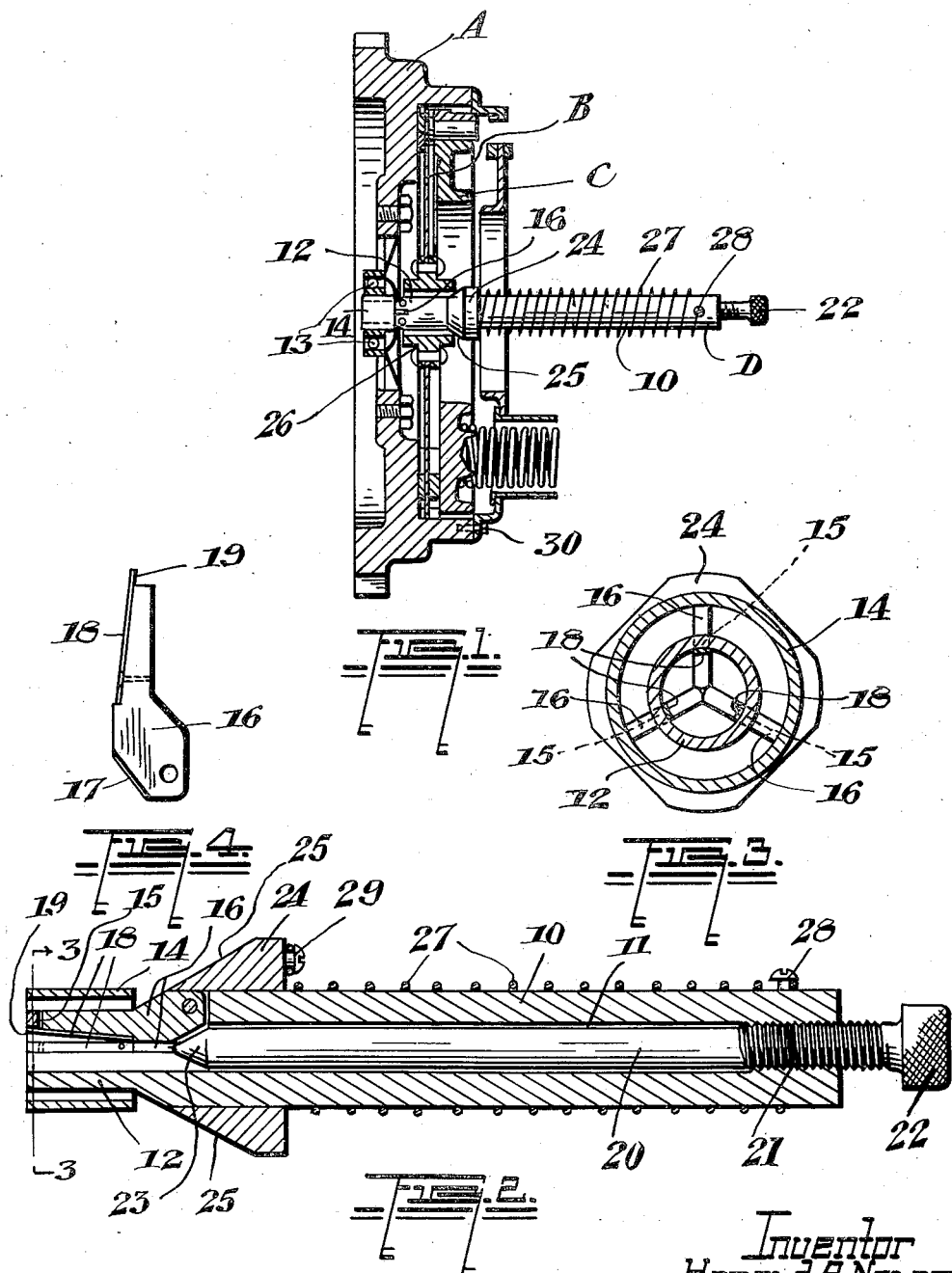

1,986,156

UNITED STATES PATENT OFFICE 1,986,156

CLUTCH ASSEMBLING TOOL

Harold Allan Nelson, Calgary, Alberta, Canada

Application November 17, 1932, Serial No. 643,006
In Canada July 28, 1932

7 Claims. (Cl. 29—89)

This invention relates to clutch assembling tools and an object of the invention is to provide a tool which may be operated to facilitate the work in assembling clutch mechanism by holding the clutch plate in position while other parts are being assembled.

A further object of the invention is to provide a very simple tool of this character which may be inserted and withdrawn from the clutch mechanism very easily.

A still further object of the invention is to provide a tool which may be employed in the assembly of all types of single disc clutches.

With these and other objects in view the invention consists essentially of a tool having clamping means to secure it in the clutch pilot bearing and a movable securing member designed to engage the clutch disc, with means for operating the clamping means and means for urging the securing member into engagement with the clutch and disc, as more fully described in the following specification and illustrated in the accompanying drawing which forms part of the same.

In the drawing:—

Figure 1 is a sectional side elevation of a clutch assembly showing the tool in mounted position within the pilot bearing and holding the clutch disc in its normal position.

Figure 2 is a sectional side elevation taken through the tool.

Figure 3 is an enlarged section taken on the line 3—3 of Figure 2, and

Figure 4 is a detail of one of the clamping fingers and associated leaf springs.

Referring more particularly to the drawing, A indicates the fly wheel assembly of a motor car with which is associated the clutch mechanism including the clutch disc B and clutch pressure plate C. The tool D is designed for holding the clutch disc B in its normal position in reassembling the clutch mechanism. The tool is preferably in the form of a shaft 10, or sleeve, which is provided with a central bore 11 the shaft or sleeve being reduced at one end to form a projecting nose 12. The nose is adapted to be inserted within the clutch pilot bearing 13, as illustrated in Figure 1 and to directly engage with the pilot bushing 14 of this bearing, as illustrated in Figure 2. To this end the nose 12 is formed with a plurality of slots 15 within which are pivoted clamping fingers 16, movable about their pivots to project outwardly from the nose, as illustrated in dotted lines in Figure 2, to engage with the pilot bushing and centre the tool therein, or, to lie within the slots 15 with their outer surfaces flush with the nose 12, when not operated to outwardly project.

The fingers 16 are formed with a sloped or bevelled surface 17 adjacent to and to one side of the pivotal point, the other end of the finger having a leaf spring 18, rigidly secured thereto and projecting beyond the end of the finger, as at 19.

Within the bore 11 of the shaft 10, is mounted an operating rod or member 20 which is screw threaded as at 21, to engage with screw threading within the bore 11, to axially urge the rod forward or backward upon rotating the rod in one direction or another. The rod is provided with a knurled hand grip 22 at one end for facilitating rotation of the rod. At the other end it is formed with a coned surface 23 which is adapted to lie adjacent to the bevelled surfaces 17 of the clamping fingers 16, so that, when the rod is rotated in one direction to urge it forward in an axial direction through the shaft 10, the coned end 23 will move against the bevelled edges 17 of the fingers 16 and consequently turn the fingers about their pivotal points to swing the free ends thereof, outwardly, to engage the inner surface of the pilot bushing 14, this position being illustrated in dotted lines in Figure 2. The projecting end 19 of the springs 18 will, however, overlie the end of the slots 15, as illustrated in Figure 2 and consequently when the rod 10 is urged axially forward the fingers 16 are moved outwardly against the action of the leaf springs 18 so that when the rod is moved axially backward and the coned end 23 moves away from engagement with the bevelled edges 17, the springs 18 will return the fingers to their normal position and out of engagement with the pilot bushing 14. The fingers, of course, in view of the construction, move to the same degree so that the tool is centred in the pilot bushing when the fingers engage therewith. It is therefore apparent that the rod 20 constitutes means for operating the clamping fingers into firm engagement with the pilot bushing or sleeve member to centre and hold the tool therein and, the springs 18, constitute means for returning these fingers to normal position upon the first operation of the rod 20.

Slidably mounted upon the shaft 10 is the clutch disc securing or clamping member 24 which is formed with a conical outer surface 25 adapted to engage with the hub 26 of the clutch disc. The slidable member 24 is normally urged to the forward end of the shaft 10 by means of a coil spring 27 which is wound around the shaft 10 and anchored at one end to the shaft by means of a stud 28 and anchored at the other end to the slidable member 24 by means of a stud or the like 29. This coil spring is made sufficiently strong to urge the slidable member 24 forwardly and firmly hold an object with which it may be engaged but it is apparent that by applying a slightly greater pressure to the slidable member 24, it may be moved against the pressure of the spring 27 towards the rearward end of the shaft.

In operation, assuming the clutch mechanism to be removed from the fly wheel assembly, the nose 12 of the tool is inserted within the pilot bushing of the clutch pilot bearing and the rod 20 is rotated so that it is axially urged forwardly within the shaft 10. Upon its conical end 23 contacting with the bevelled edges of the fingers 16, these fingers are swung about their pivotal points so that their free ends firmly engage the inner surface of the pilot bushing and thus centre and rigidly secure the tool within this bushing in a position illustrated in Figure 1. Prior to the mounting of the tool in the pilot bushing the slidable member 24 has been moved towards the rear of the shaft and the clutch disc has been slid onto the shaft 10, so that upon releasing the slidable member 24, the coil spring 27 urges it forwardly to firmly engage the hub of the clutch disc and this properly centres it with respect to the fly wheel assembly in its normal position. The clutch pressure disc is then mounted in its proper position and bolted on the fly wheel assembly by means of bolts 30 and when this has been bolted in position it engages with the clutch disc and serves to hold it in its normal position. The rod 20 of the tool is then rotated so as to move it axially backward so that the coned end 23 is removed from engagement with the bevelled edges 17 of the fingers 16 and through the medium of the springs 18 these fingers are returned to normal position within the slots 15, thus disengaging the tool from the pilot bushing, whereupon it is removed. The drive shaft of the car can then be mounted in its proper position with its end inserted within the pilot bearing.

It is apparent therefore, that through the medium of this tool, a great deal of trouble and time is avoided in assembling clutch mechanism through the fact that the clutch disc is first held in its normal position and it is not necessary to work with a loose clutch disc and endeavour to get it centred properly and at the same time mount the clutch pressure plate. The slidable member 24 might also be operated axially on the shaft by means of screw threading to axially move and tightly engage the coned surface with the clutch. It is preferable, however, that this member be constructed to slide on the shaft under spring pressure. It may be particularly noted that the slidable member 24 is of considerable size and that the cone surface will therefore serve to engage with the hub of clutch plates regardless of the fact as to whether or not they vary in size. It will be understood therefore, that the tool may be used for all makes of clutch assembly employing a single disc.

Various modifications may be made in this invention without departing from the spirit thereof or the scope of the claims, and therefore the exact forms shown are to be taken as illustrative only and not in a limiting sense, and it is desired that only such limitations shall be placed thereon as are disclosed in the prior art or are set forth in the accompanying claims.

What I claim is:—

1. A clutch assembling tool comprising a shaft, clamping means on said shaft operating to centre and secure said shaft in a sleeve like member and means axially movable on said shaft for yieldably engaging a clutch disc through which said shaft extends.

2. A device as claimed in claim 1 in which the means on said shaft for engaging an object comprises a cone shaped member movable axially on the shaft and a spring against the tension of which said member is designed to yieldably engage the object to be assembled.

3. A clutch assembling tool comprising a shaft, clamping means on said shaft operable to centre and secure the shaft in a sleeve like member and a slidable member on said shaft for yieldably engaging a clutch disc through which the shaft extends, and means for engaging said member with the clutch disc.

4. A device as claimed in claim 3 in which the slidable member is normally urged towards one end of the shaft by means of a spring.

5. A clutch assembling tool comprising a hollow shaft, a plurality of pivotally mounted swingable fingers carried in one end of the shaft, an axially movable rod carried within said shaft, to engage and disengage with said fingers to operate them into engagement or release them from the clutch pilot bushing, means in connection with said fingers for returning them to normal position when said rod has been disengaged from them and a spring pressed slidable member carried by said shaft formed with a conical surface adapted to engage with the clutch disc to centre and retain the clutch disc in normal position relative to said bushing during the assembling operation.

6. A clutch assembling tool comprising a shaft, means on said shaft for centring the latter in the clutch pilot bushing, an axially movable cone on said shaft for engaging and centring the clutch disc relative to said bushing, and means for yieldably engaging said cone with said disc under pressure.

7. A clutch assembling tool comprising a shaft, a plurality of swingable fingers pivotally mounted in one end of said shaft and adapted to protrude outwardly therefrom through slots therein, means in connection with the shaft for operating said fingers to secure the shaft in a sleeve like member, each of said fingers being provided with a leaf spring adapted to engage with a part of the shaft, said leaf springs being adapted to return the fingers to normal position, an axially movable member having a conical surface mounted on said shaft for engaging a clutch disc through which said shaft extends and spring means for yieldably engaging said member with the disc.

HAROLD ALLAN NELSON.